United States Patent
Ananda et al.

(10) Patent No.: US 10,932,149 B2
(45) Date of Patent: Feb. 23, 2021

(54) USING NARROWBAND REFERENCE SIGNAL (NRS) TONES IN A NON-ANCHOR CARRIER TO DETERMINE QUALITY OF THE NON-ANCHOR CARRIER

(71) Applicant: QUALCOMM Incorporated, San Diego, CA (US)

(72) Inventors: Raghavendra Shyam Ananda, Hyderabad (IN); Srikanth Menon, Hyderabad (IN); Alberto Rico Alvarino, San Diego, CA (US); Le Liu, Fremont, CA (US); Tae Min Kim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 14 days.

(21) Appl. No.: 16/371,687

(22) Filed: Apr. 1, 2019

(65) Prior Publication Data

US 2019/0313268 A1  Oct. 10, 2019

Related U.S. Application Data

(60) Provisional application No. 62/653,161, filed on Apr. 5, 2018.

(51) Int. Cl.
*H04W 24/08* (2009.01)
*H04W 72/12* (2009.01)

(52) U.S. Cl.
CPC ........... *H04W 24/08* (2013.01); *H04W 72/12* (2013.01)

(58) Field of Classification Search
CPC ..... H04W 24/08; H04W 72/12; H04W 68/00; H04L 5/001; H04L 5/0048
See application file for complete search history.

(56) References Cited

U.S. PATENT DOCUMENTS

2018/0287845 A1* 10/2018 Kim .................... H04L 27/2666
2019/0253231 A1*  8/2019 Park ..................... H04L 5/0053

OTHER PUBLICATIONS

U.S. Appl. No. 62/586,186, filed 2017.*
U.S. Appl. No. 62/590,368, filed 2017.*
U.S. Appl. No. 62/591,142, filed 2017.*
U.S. Appl. No. 62/630,840, filed 2018.*
U.S. Appl. No. 62/635,448, filed 2018.*
Intel Corporation: "On Presence of NRS on Non-Anchor Carriers", 3GPP Draft; R1-1702159—INTEL-ENB-IOT_NRS, 3rd Generation Partnership Project (3GPP), vol. RAN WG1, No. Athens, Greece; Feb. 13, 2017-Feb. 17, 2017, Feb. 12, 2017 (Feb. 12, 2017), pp. 1-3, (Year: 2017).*

(Continued)

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment may receive a configuration for identifying narrowband reference signal (NRS) tones that are to be received in association with a scheduled paging occasion, wherein the NRS tones are configured to be received via a non-anchor carrier regardless of whether a page is to be received in connection with the scheduled paging occasion; and receive the NRS tones via the non-anchor carrier based at least in part on the configuration. Numerous other aspects are provided.

30 Claims, 13 Drawing Sheets

(56) References Cited

OTHER PUBLICATIONS

Ericsson: "Relaxed Monitoring in NB-IoT", 3GPP Draft; R2-1708273 Relaxed Monitoring in NB-IoT, 3rd Generation Partnership Project (3GPP), vol. RAN WG2, No. Berlin, Germany; Aug. 21, 2017-Aug. 25, 2017, Aug. 20, 2017 (Aug. 20, 2017), pp. 1-10, XP051318173, Retrieved from the Internet: URL: http://www.3gpp.org/ftp/Meetings_3GPP_SYNC/RAN2/Docs/ [retrieved on Aug. 20, 2017], Section 2.
Intel Corporation: "On Presence of NRS on Non-Anchor Carriers", 3GPP Draft; R1-1702159—INTEL-ENB-IOT_NRS, 3rd Generation Partnership Project (3GPP), vol. RAN WG1, No. Athens, Greece; Feb. 13, 2017-Feb. 17, 2017, Feb. 12, 2017 (Feb. 12, 2017), pp. 1-3, XP051209318, Retrieved from the Internet: URL: http://www.3gpp.org/ftp/Meetings_3GPP_SYNC/RAN1/Docs/ [retrieved on Feb. 12, 2017], Sections 1, 2.2, 2.3.
International Search Report and Written Opinion—PCT/US2019/025392—ISA/EPO—dated Aug. 12, 2019.
Partial International Search Report—PCT/US2019/025392—ISA/EPO—dated Jun. 13, 2019.
Qualcomm Incorporated: "Further Discussion on WUS Configurations and Procedures", 3GPP Draft; R1-1802332_WUS Config, 3rd Generation Partnership Project (3GPP), vol. RAN WG1, No. Athens, Greece; Feb. 26, 2018-Mar. 2, 2018, Feb. 17, 2018 (Feb. 17, 2018), pp. 1-6, XP051397860, Retrieved from the Internet: URL: http://www.3gpp.org/ftp/tsg_ran/WG1_RL1/TSGR1_92/Docs/ [retrieved on Feb. 17, 2018], Proposal 2.
ZTE: "RRM Measurement on Non-Anchor Carrier", 3GPP Draft; R4-1701221, 3rd Generation Partnership Project (3GPP), vol. RAN WG4, No. Athens, Greece; Feb. 13, 2017-Feb. 17, 2017, Feb. 12, 2017 (Feb. 12, 2017), 2 pages, XP051214279, Retrieved from the Internet: URL: http://www.3gpp.org/ftp/Meetings_3GPP_SYNC/RAN4/Docs/ [retrieved on Feb. 12, 2017], Section 2.

* cited by examiner

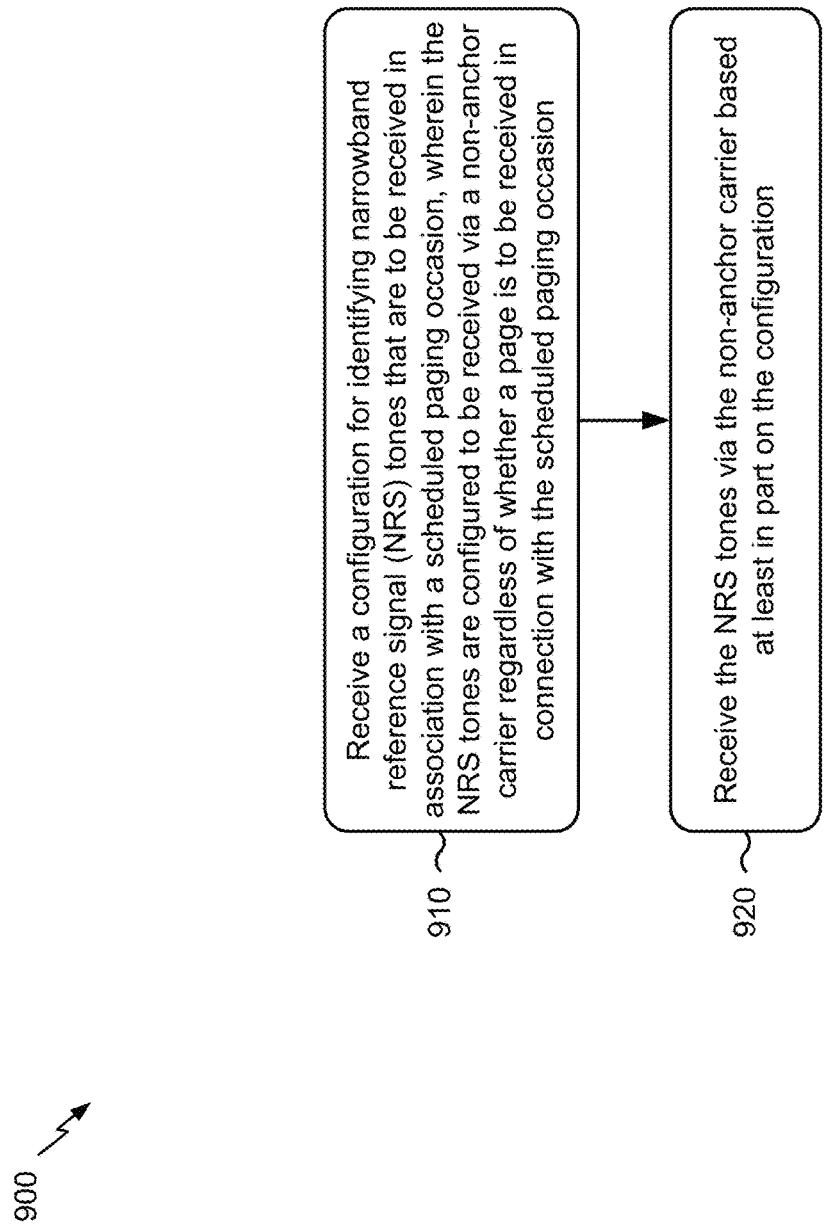

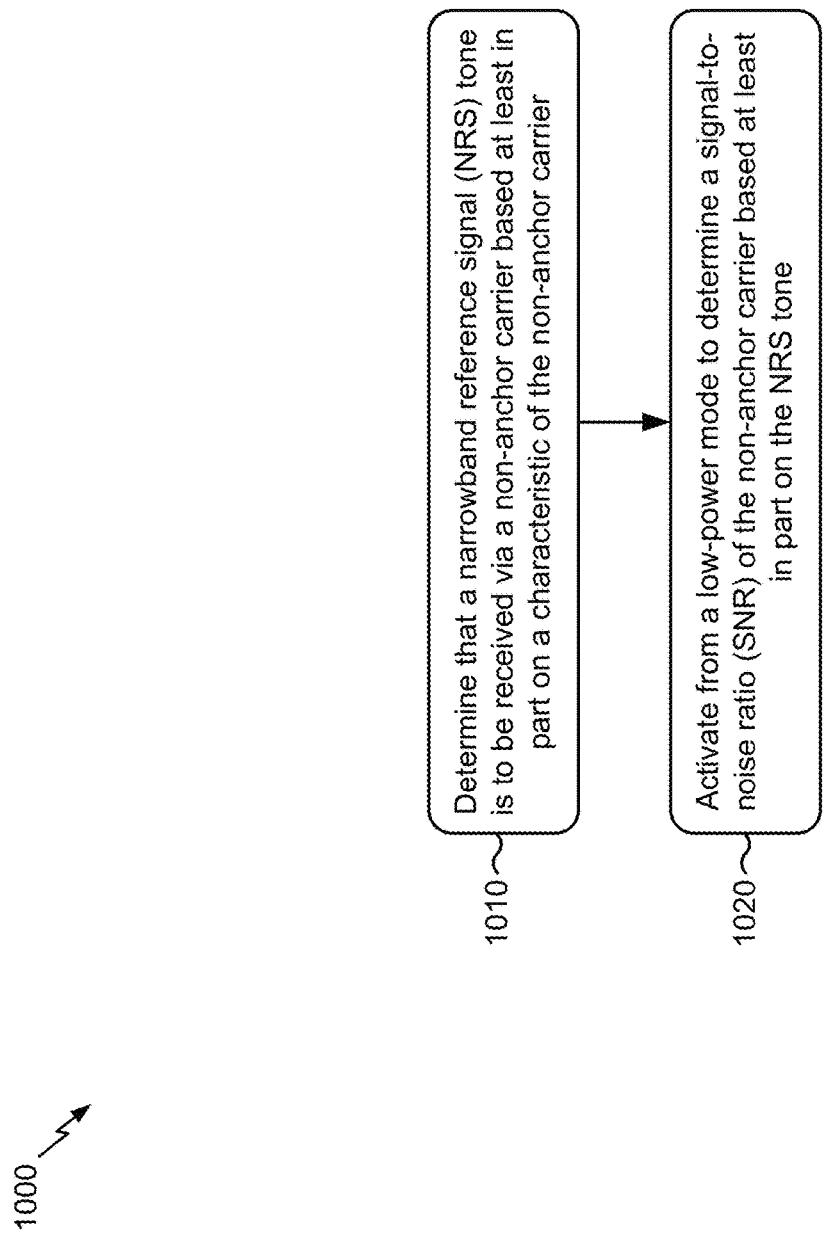

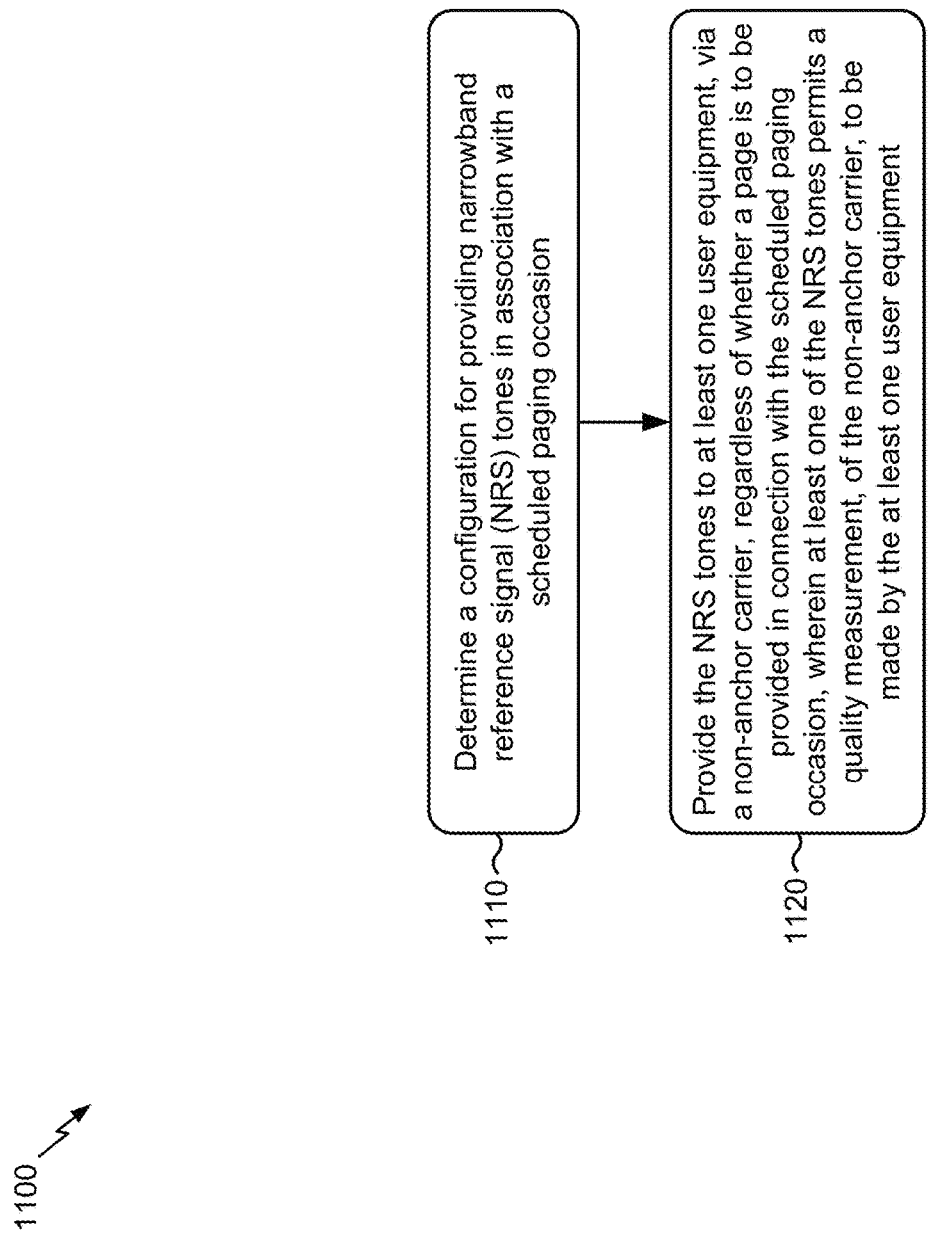

USING NARROWBAND REFERENCE SIGNAL (NRS) TONES IN A NON-ANCHOR CARRIER TO DETERMINE QUALITY OF THE NON-ANCHOR CARRIER

CROSS-REFERENCE TO RELATED APPLICATIONS UNDER 35 U.S.C. § 119

This application claims priority to U.S. Provisional Patent Application No. 62/653,161, filed on Apr. 5, 2018, entitled "TECHNIQUES AND APPARATUSES FOR USING NARROWBAND REFERENCE SIGNAL (NRS) TONES IN A NON-ANCHOR CARRIER TO DETERMINE QUALITY OF THE NON-ANCHOR CARRIER," which is hereby expressly incorporated by reference herein.

FIELD OF THE DISCLOSURE

Aspects of the present disclosure generally relate to wireless communication, and more particularly to techniques and apparatuses for using narrowband reference signal (NRS) tones in a non-anchor carrier to determine quality of the non-anchor carrier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration for identifying narrowband reference signal (NRS) tones that are to be received in association with a scheduled paging occasion, wherein the NRS tones are configured to be received via a non-anchor carrier regardless of whether a page is to be received in connection with the scheduled paging occasion; and receiving the NRS tones via the non-anchor carrier based at least in part on the configuration.

In some aspects, a user equipment for wireless communication may include memory and one or more processors operatively coupled to the memory. The memory and the one or more processors may be configured to receive a configuration for identifying NRS tones that are to be received in association with a scheduled paging occasion, wherein the NRS tones are configured to be received via a non-anchor carrier regardless of whether a page is to be received in connection with the scheduled paging occasion; and receive the NRS tones via the non-anchor carrier based at least in part on the configuration.

In some aspects, a non-transitory computer-readable medium may store one or more instructions for wireless communication. The one or more instructions, when executed by one or more processors of a user equipment, may cause the one or more processors to receive a configuration for identifying NRS tones that are to be received in association with a scheduled paging occasion, wherein the NRS tones are configured to be received via a non-anchor carrier regardless of whether a page is to be received in connection with the scheduled paging occasion; and receive the NRS tones via the non-anchor carrier based at least in part on the configuration.

In some aspects, an apparatus for wireless communication may include means for receiving a configuration for identifying NRS tones that are to be received in association with a scheduled paging occasion, wherein the NRS tones are configured to be received via a non-anchor carrier regardless of whether a page is to be received in connection with the scheduled paging occasion; and during the scheduled paging occasion, means for receiving the NRS tones via the non-anchor carrier based at least in part on the configuration.

In some aspects, a method of wireless communication, performed by a UE, may include determining that an NRS tone is to be received via a non-anchor carrier based at least in part on a characteristic of the non-anchor carrier; and activating from a low-power mode to determine a signal-to-noise ratio (SNR) of the non-anchor carrier based at least in part on the NRS tone.

In some aspects, a user equipment for wireless communication may include memory and one or more processors operatively coupled to the memory. The memory and the one or more processors may be configured to determine that an NRS tone is to be received via a non-anchor carrier based at least in part on a characteristic of the non-anchor carrier; and activate from a low-power mode to determine an SNR of the non-anchor carrier based at least in part on the NRS tone.

In some aspects, a non-transitory computer-readable medium may store one or more instructions for wireless communication. The one or more instructions, when executed by one or more processors of a user equipment, may cause the one or more processors to determine that an NRS tone is to be received via a non-anchor carrier based at least in part on a characteristic of the non-anchor carrier; and activate from a low-power mode to determine an SNR of the non-anchor carrier based at least in part on the NRS tone.

In some aspects, an apparatus for wireless communication may include means for determining that an NRS tone is to be received via a non-anchor carrier based at least in part on a characteristic of the non-anchor carrier; and means for activating from a low-power mode to determine an SNR of the non-anchor carrier based at least in part on the NRS tone.

In some aspects, a method of wireless communication, performed by a base station (BS), may include determining a configuration for providing NRS tones in association with a scheduled paging occasion; and providing the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment.

In some aspects, a base station for wireless communication may include memory and one or more processors operatively coupled to the memory. The memory and the one or more processors may be configured to determine a configuration for providing NRS tones in association with a scheduled paging occasion; and provide the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment.

In some aspects, a non-transitory computer-readable medium may store one or more instructions for wireless communication. The one or more instructions, when executed by one or more processors of a base station, may cause the one or more processors to determine a configuration for providing NRS tones in association with a scheduled paging occasion; and provide the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment.

In some aspects, an apparatus for wireless communication may include means for determining a configuration for providing NRS tones in association with a scheduled paging occasion; and means for providing the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes performed, for example, by a user equipment, in accordance with various aspects of the present disclosure.

FIG. 11 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
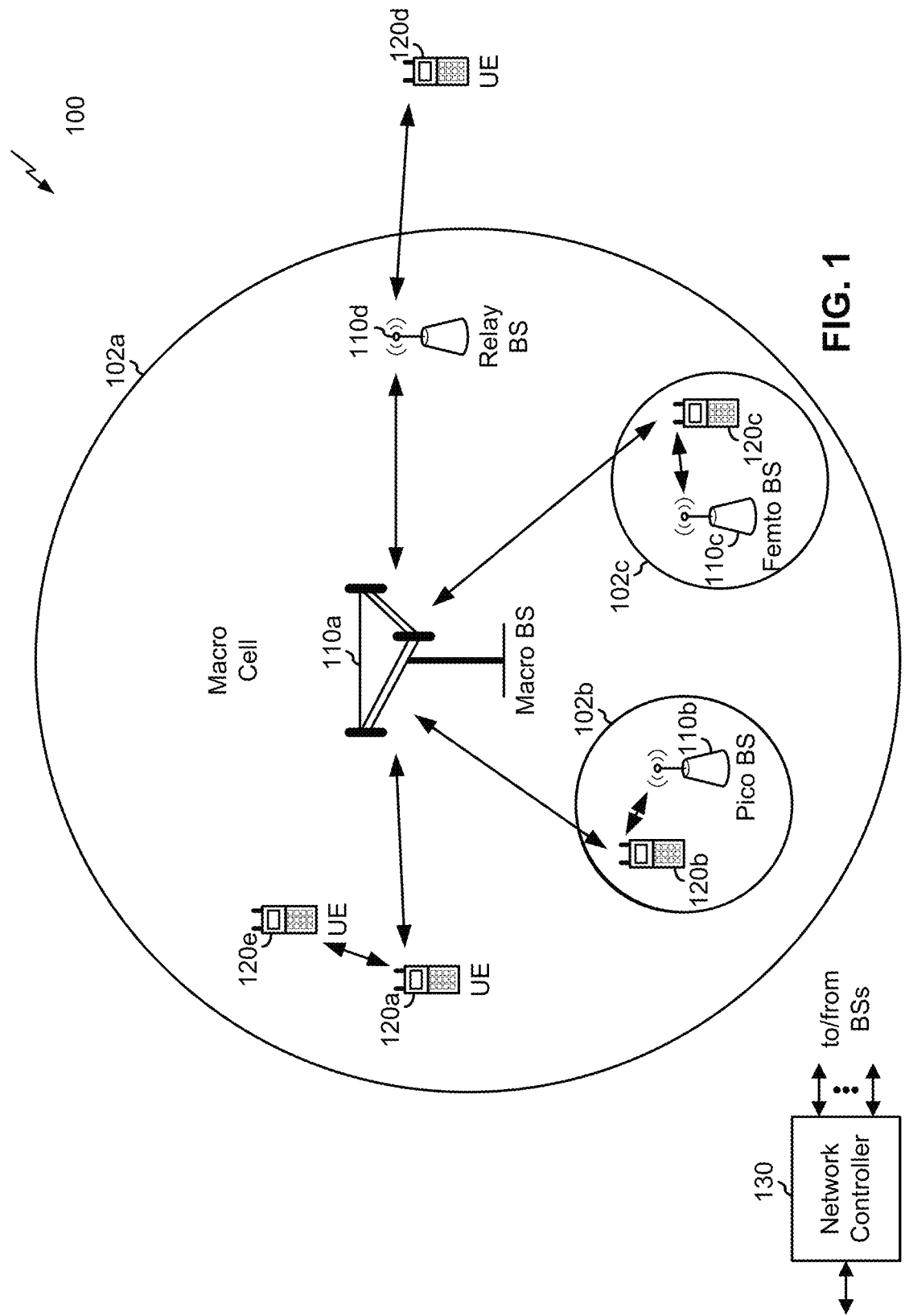
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
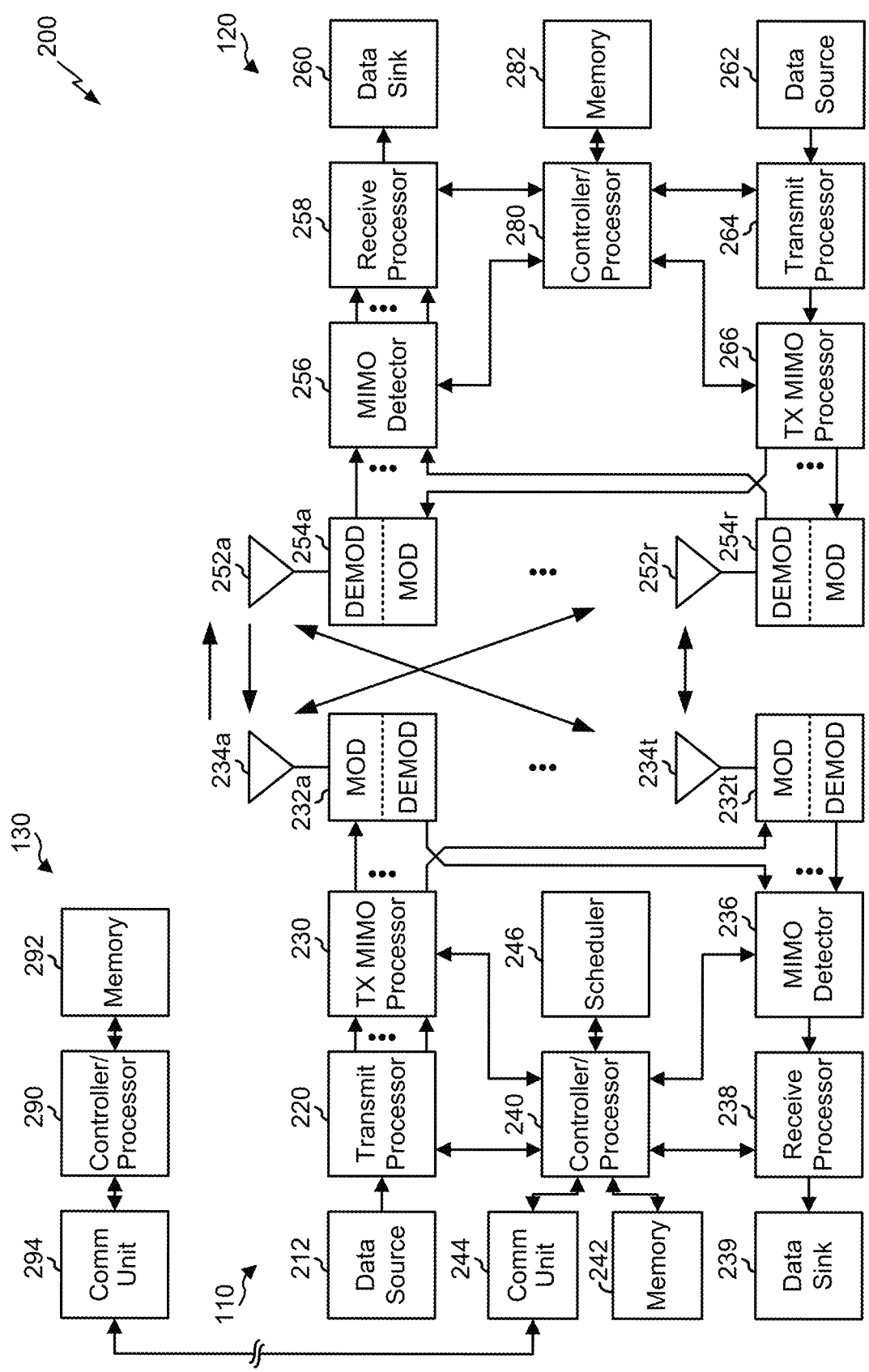
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with using narrowband reference signal (NRS) tones in a non-anchor carrier to determine quality of the non-anchor carrier, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration for identifying narrowband reference signal (NRS) tones that are to be received in association with a scheduled paging occasion, wherein the NRS tones are configured to be received via a non-anchor carrier regardless of whether a page is to be received in connection with the scheduled paging occasion; means for receiving the NRS tones via the non-anchor carrier based at least in part on the configuration; and/or the like. In some aspects, such means may include one or more components of UE 120 described in connection with FIG. 2.

In some aspects, UE 120 may include means for determining that an NRS tone is to be received via a non-anchor carrier based at least in part on a characteristic of the non-anchor carrier; means for activating from a low-power mode to determine a signal-to-noise ratio (SNR) of the non-anchor carrier based at least in part on the NRS tone; and/or the like. In some aspects, such means may include one or more components of UE 120 described in connection with FIG. 2.

In some aspects, base station 110 may include means for determining a configuration for providing NRS tones in association with a scheduled paging occasion; means for providing the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
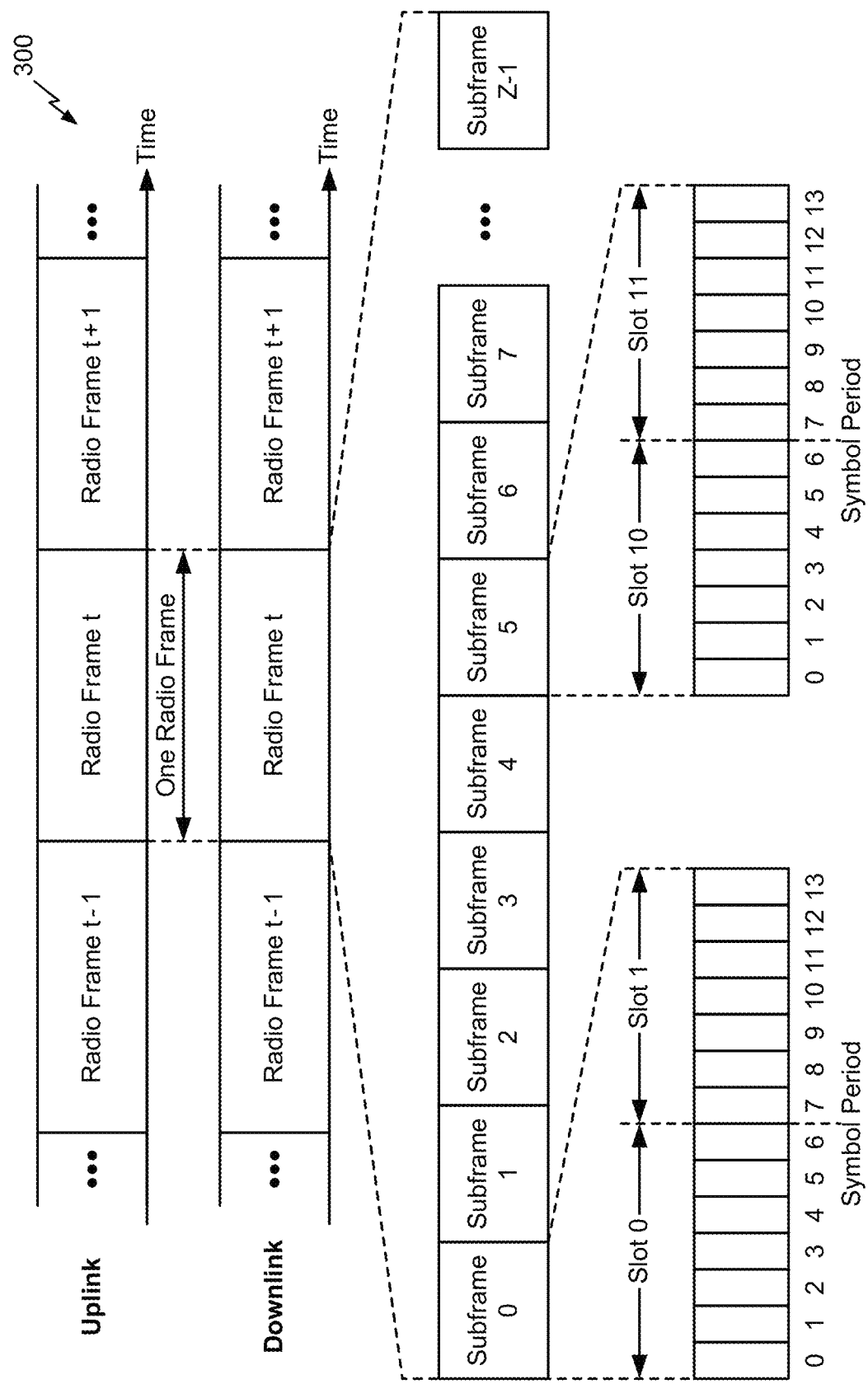
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
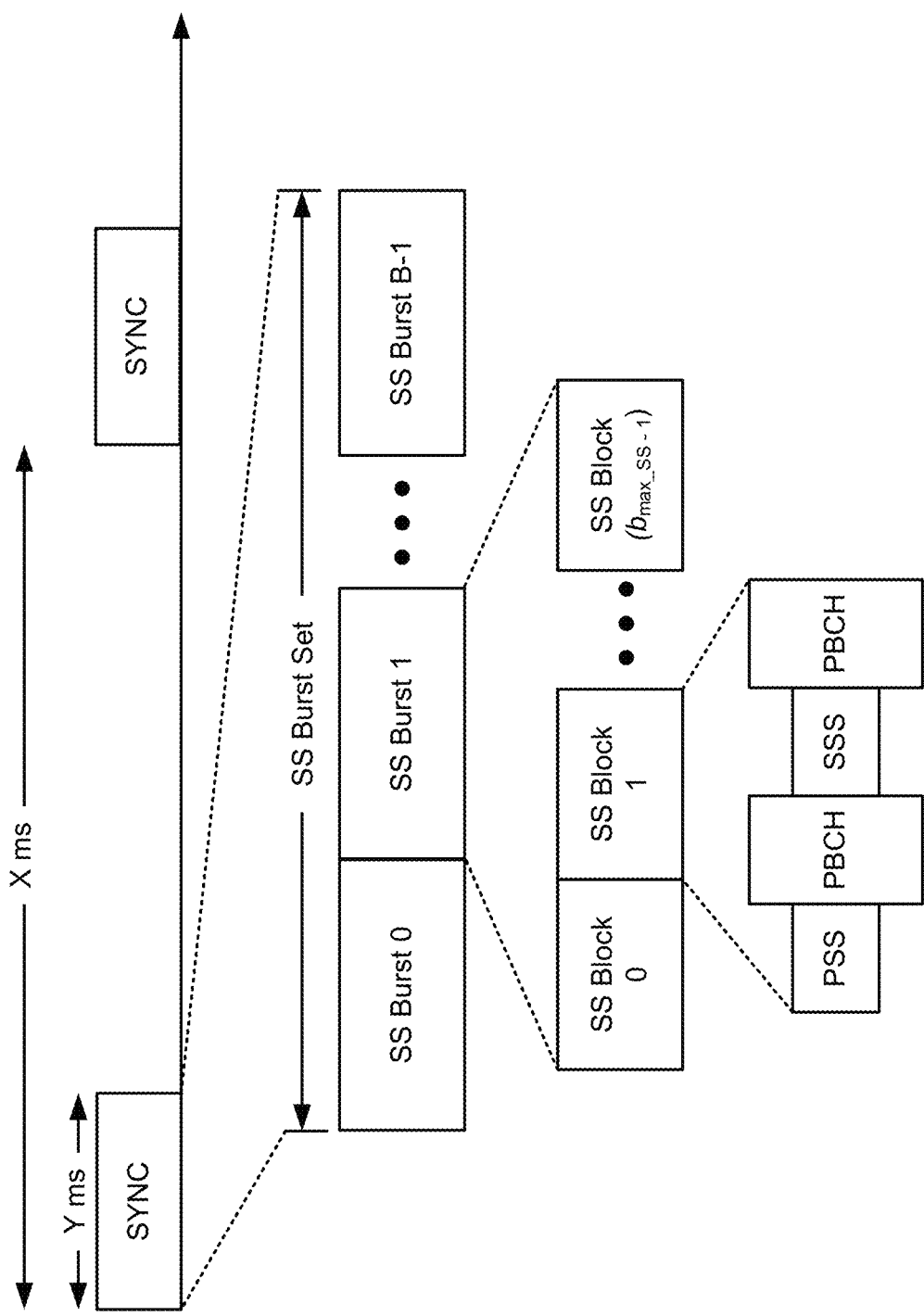
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe.

The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
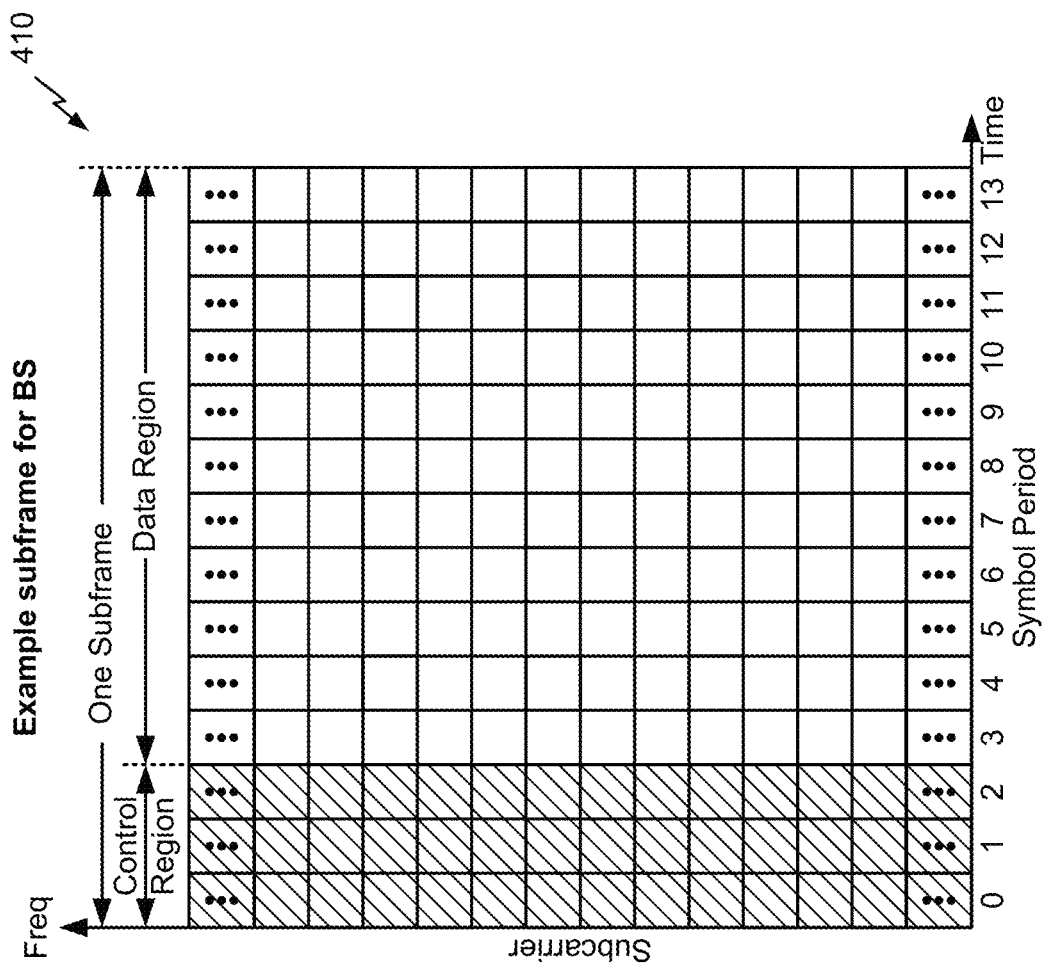
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In some instances, a base station (e.g., BS 110) and a user equipment (e.g., UE 120) may communicate with one another via an anchor carrier and a non-anchor carrier pair. The anchor carrier may be used for synchronization between the BS and the UE, and the non-anchor carrier may be used for paging. According to some instances, quality measurements (e.g., radio resource management (RRM) measurements) of the anchor carrier are to be performed every discontinuous reception (DRX) cycle. Such quality measurements may be used to determine whether the UE is to reselect an anchor carrier/non-anchor carrier pair for communication with the BS.

However, due to the anchor carrier and non-anchor carrier being separated by a frequency (e.g., 20 MHz), which may be preconfigured, and having different power characteristics, the anchor carrier and non-anchor carrier may be subject to different levels of interference. Therefore, the quality of the anchor carrier may not indicate, represent, or be the same as the quality of the non-anchor carrier. In some instances, interference on the non-anchor carrier may prevent the UE from receiving pages from the BS, despite the anchor carrier having strong quality. If a page is not received via the non-anchor carrier due to the interference, the UE may not be able to determine the quality of the non-anchor carrier (e.g., because NRS tones may be present only when the page is present or received). Furthermore, if the quality of the anchor carrier is strong (e.g., the signal-to-noise ratio (SNR) of the anchor carrier satisfies a threshold), the UE may not reselect a different anchor carrier/non-anchor carrier pair because the UE may not recognize the interference on the non-anchor carrier without receiving the page.

Some aspects, described herein, permit a UE to detect interference on the non-anchor carrier and determine whether a reselection of an anchor carrier/non-anchor carrier pair should be made by making a quality measurement of the non-anchor carrier even when a page is not received. For example, NRS tones (pilot signals) may be made available to the UE during a paging occasion regardless of whether a page is present or received via the non-anchor carrier. In some aspects, a BS may be configured to transmit the NRS tones during a scheduled paging occasion (e.g., during every paging occasion, once every Mth DRX cycle, and/or the like), and a UE may be configured to receive the NRS tones during the scheduled paging occasion. Therefore, the UE may determine the quality of the non-anchor carrier based at least in part on the NRS tones to determine whether a reselection of the anchor carrier/non-anchor carrier pair is to be made for communication with the BS. In some aspects, the UE may monitor the non-anchor carrier to determine whether NRS tones are to be present on the non-anchor carrier based at least in part on a characteristic of the non-anchor carrier. For example, the UE may determine that the non-anchor carrier is to be used during a random access channel (RACH) procedure, which may involve receiving NRS tones from the BS. The UE may detect the NRS tones associated with the RACH procedure and determine the quality of the non-anchor carrier based at least in part on the NRS tones associated with the RACH procedure.

Accordingly, examples herein enable a UE to make a quality measurement of a non-anchor carrier using NRS tones within the non-anchor carrier. As a result, the UE may conserve power resources and/or processing resources by performing an early termination of page monitoring and not wasting the power resources and/or processing resources to monitor for pages when there is a strong non-anchor carrier connection (because the NRS tones indicate the strong connection). Furthermore, some aspects described herein may prevent a UE from missing one or more pages by performing a reselection of the anchor carrier/non-anchor carrier pair when the measure of quality of the non-anchor carrier does not satisfy a threshold, thus conserving power resources and/or processing resources that may otherwise be consumed due to missing the pages. Still further, some aspects described herein may enable a UE to maintain synchronization with the BS based at least in part on the quality measurements of the non-anchor carrier, thus conserving power resources and/or processing resources associated with the UE searching for anchor carrier/non-anchor carrier pairs to keep synchronization with BS.

Figure 5:
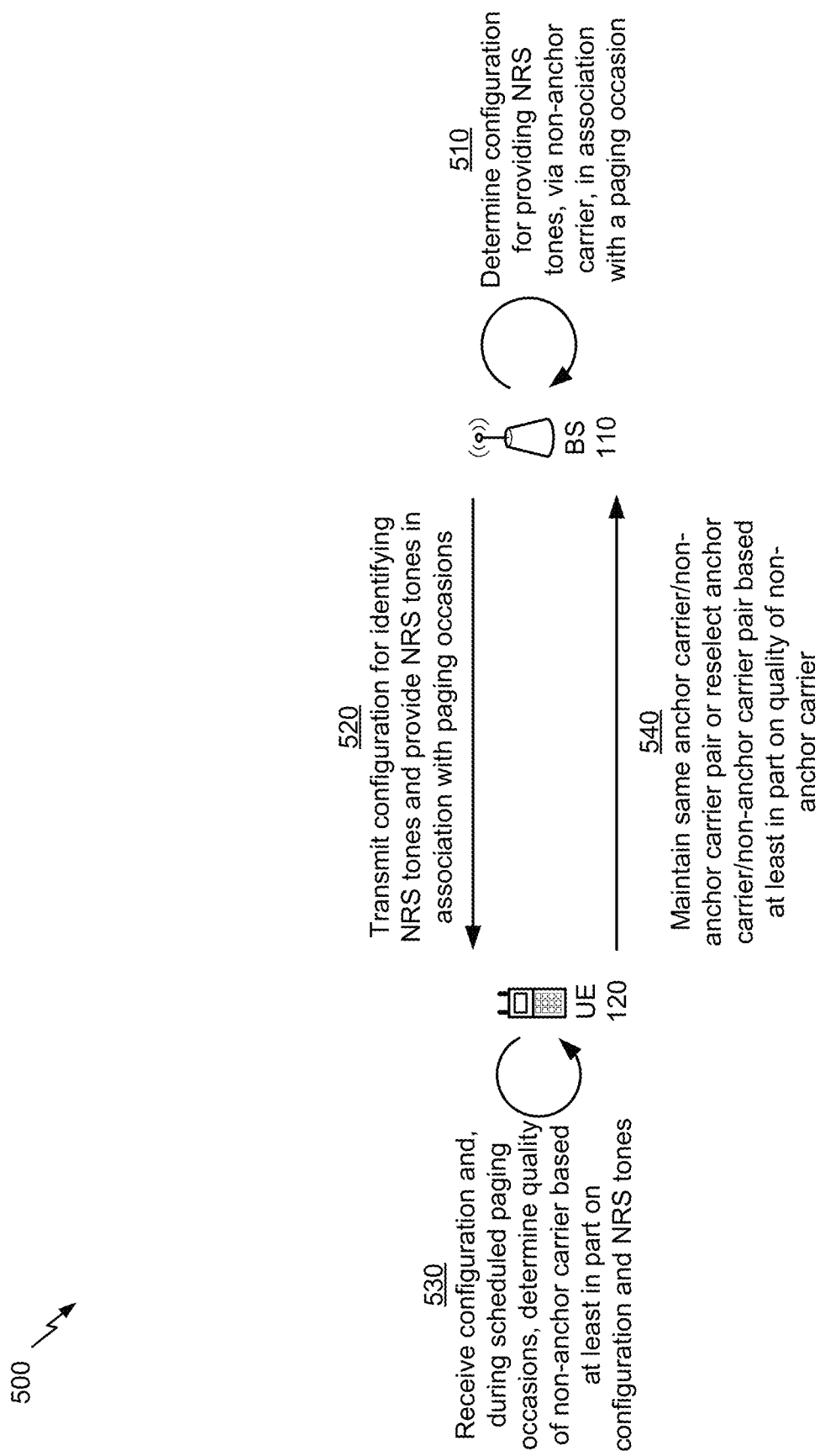
FIGS. 5-7, 8A, and 8B are diagrams illustrating examples associated with using narrowband reference signal (NRS) tones in a non-anchor carrier to determine a measure of quality of the non-anchor carrier, in accordance with various aspects of the present disclosure.

FIG. 5 is a diagram illustrating an example 500 of using NRS tones in a non-anchor carrier to determine a measure of quality of the non-anchor carrier, in accordance with various aspects of the present disclosure. As shown in FIG. 5, example 500 includes a BS 110 and a UE 120. In example 500 of FIG. 5, UE 120 uses NRS tones to assess the quality of the non-anchor carrier used during a communication session with BS 110.

As shown in FIG. 5, and by reference number 510, BS 110 determines a configuration for providing NRS tones, via a non-anchor carrier, in association with a paging occasion. The NRS tones may be used by the UE 120 to determine a quality measurement of the non-anchor carrier. The paging occasion may be a scheduled paging occasion. In some aspects, paging occasions may be scheduled or configured such that UE 120 is to monitor for pages at or during a time period associated with the paging occasions, during particular locations of subframes, and/or the like. According to some aspects described herein, the configuration indicates that the NRS tones are to be provided regardless of whether a page is transmitted to UE 120 in association with the paging occasion.

In some aspects, the configuration may identify a spreading factor (SF) (e.g., a minimum SF) of the NRS tones relative to a timing of the paging occasion. For example, the SF may indicate a number of subframes that are to include NRS tones before, after, or during the paging occasion. In some aspects, the configuration may indicate that zero NRS tones are to be received when NRS tones, in the non-anchor carrier, are not to be used to determine a quality measurement. In some aspects, the configuration identifies locations of the NRS tones relative to the scheduled paging occasion. For example, the configuration may indicate within which subframes, relative to the paging occasion, the NRS tones are to be included. More specifically, as described herein, the configuration may indicate one or more sets of subframes that are to include the NRS tones relative to which subframe is associated with the paging occasion (e.g., at which subframe the paging occasion is to occur). In some aspects, the configuration may be preconfigured according to a specification of a network associated with BS 110 and UE 120. For example, a number of the NRS tones that are to be provided to UE 120 may be preconfigured based at least in part on the specification of the network.

In some aspects, the configuration may indicate when NRS tones are to be provided according to DRX cycles. For example, the configuration may indicate the NRS tones are to be provided once every Mth DRX cycle, where M is a threshold number of DRX cycles. Accordingly, on the Mth DRX cycle, UE 120 may be configured to monitor for and/or receive the NRS tones. Accordingly, during the remaining M−1 DRX cycles between the Mth DRX cycles, UE 120 may enter into a low-power mode. For example, UE 120 may enter into a sleep mode during the remaining M−1 DRX cycles between the Mth DRX cycles. In sleep mode, UE 120 may perform (in some instances, only perform) wake up signal (WUS) detection or narrowband physical downlink control channel (NPDCCH) detection if the UE 120 does not have WUS detection capabilities. Accordingly, UE 120 may wake up to determine a measure of quality of the non-anchor carrier if regularly received NRS tones and a paging occasion do not overlap. In some aspects, the configuration may identify at least one of a periodicity, a timing, an offset, or a number of subframes associated with the NRS tones regardless of the DRX cycle. For example, the configuration may identify that BS 110 is configured to provide (and UE 120 is to be configured to receive) the NRS tones every threshold period of time (e.g., every 5 ms, every 10 ms, and/or the like) or every X number of subframes (e.g., every 15th subframe, every 30th subframe, and/or the like).

As further shown in FIG. 5, and by reference number 520, BS 110 may transmit the configuration for identifying the NRS tones to UE 120 and provide the NRS tones in association with paging occasions. In some aspects, BS 110 may transmit the configuration within a communication that includes system information (SI). For example, BS 110 may broadcast the configuration within the SI to enable UE 120 to successfully connect to a network associated with BS 110. Accordingly, UE 120 may receive the configuration via a broadcast from BS 110 once UE 120 is within communication range of BS 110.

In some aspects, BS 110 provides the NRS tones for every paging occasion that is scheduled for UE 120, regardless of whether a page is transmitted from BS 110 in association with the paging occasions. In some aspects, the NRS tones are provided once every threshold number of DRX cycles. Accordingly, in order to enable UE 120 to enter a low-power mode (e.g., a sleep mode), UE 120 may be configured to monitor for and/or analyze NRS tones only during every Mth DRX cycle, as described above.

As further shown in FIG. 5, and by reference number 530, UE 120 receives the configuration, and during scheduled paging occasions, determines the measure of quality of the non-anchor carrier based at least in part on the configuration and the NRS tones. For example, UE 120 may make an RRM measurement and/or an SNR measurement of the non-anchor carrier. Accordingly, regardless of whether a page is received during a particular paging occasion, UE 120 may make a quality measurement of the non-anchor carrier using the NRS tones received in association with the paging occasion. In some aspects, UE 120 may make an RRM measurement and/or an SNR measurement of the anchor carrier based at least in part on the configuration and/or based at least in part on determining a measurement associated with the non-anchor carrier.

According to some aspects, UE 120 is configured to monitor for the NRS tones according to the configuration. For example, UE 120 may be configured to monitor for the NRS tones every Mth DRX cycle. Accordingly, UE 120 may be configured to perform RRM measurements, resynchronization, SNR estimation, and/or the like based at least in part on the timing of receiving the NRS tones every Mth DRX cycle. In some aspects, UE 120 may make RRM measurements based at least in part on NRS tones in the anchor carrier, and SNR measurements based at least in part on NRS tones in the non-anchor carrier. Accordingly, UE 120 may enter into a low-power mode according to the configuration and wake up during the Mth DRX cycle and/or paging occasions to detect the NRS tones and assess the quality of the non-anchor channel. Accordingly, in some aspects, during a first DRX cycle, UE 120 may determine a quality measurement based at least in part on an NRS tone received via an anchor carrier associated with the non-anchor carrier and determine, during a second DRX cycle, an SNR based at least in part on one of the NRS tones received via the non-anchor carrier. Additionally, or alternatively, UE 120 may identify NRS tones during a first DRX cycle and perform a WUS detection or an NPDCCH detection during a second DRX cycle (that is different from the first DRX cycle). Accordingly, UE 120 may determine when to monitor for NRS tones based at least in part on the DRX cycles.

As further shown in FIG. 5, and by reference number 540, UE 120 may maintain the same anchor carrier/non-anchor carrier pair or reselect an anchor carrier/non-anchor carrier pair based at least in part on the quality of the non-anchor carrier. For example, during scheduled paging occasions, UE 120 may determine a quality measurement (e.g., RRM measurement, SNR measurement, and/or the like) of the non-anchor carrier based at least in part on one or more of the NRS tones received according to the configuration. In some aspects, UE 120 may reselect a carrier (e.g., the anchor carrier and/or non-anchor carrier) based at least in part on the quality measurement. For example, UE 120 may determine, from the quality measurement, that the non-anchor carrier is not suitable to receive a page within a threshold number of attempts to receive the page or within a threshold number of retransmissions of the page from BS 110. In such cases, the threshold number of attempts may correspond to a reliability metric of a network associated with BS 110.

In some aspects, UE 120 may maintain the same anchor carrier/non-anchor carrier pair based at least in part on the quality measurement. For example, UE 120 may maintain at least one of a time tracking loop (TTL) or frequency tracking loop (FTL) associated with BS 110 based at least in part on the quality measurement. For example, the quality measurement may indicate that the quality of the non-anchor carrier is suitable to receive a page within the threshold number of attempts to receive the page or within the threshold number of retransmissions from BS 110. In some aspects, UE 120 may avoid tuning to an anchor carrier for resynchronization when the SNR of the non-anchor carrier satisfies a threshold SNR.

Accordingly, UE 120 may be able to assess the quality of the non-anchor carrier based at least in part on the NRS tones received according to the configuration received from BS 110. When the NRS tones indicate that the quality of the non-anchor carrier is relatively high (e.g., when the SNR of the non-anchor carrier satisfies a high-quality threshold), UE 120 may terminate page monitoring and/or avoid searches to keep synchronization with BS 110 to conserve power and/or processing resources. Furthermore, when the NRS tones indicate that the quality of the non-anchor carrier is relatively low (e.g., when the SNR of the non-anchor carrier satisfies a low-quality threshold), UE 120 may conserve power and/or processing resources associated with attempting to receive pages by reselecting an anchor carrier/non-anchor carrier pair that has better quality.

As indicated above, FIG. 5 is provided as an example. Other examples may differ from what is described with respect to FIG. 5.

Figure 6:
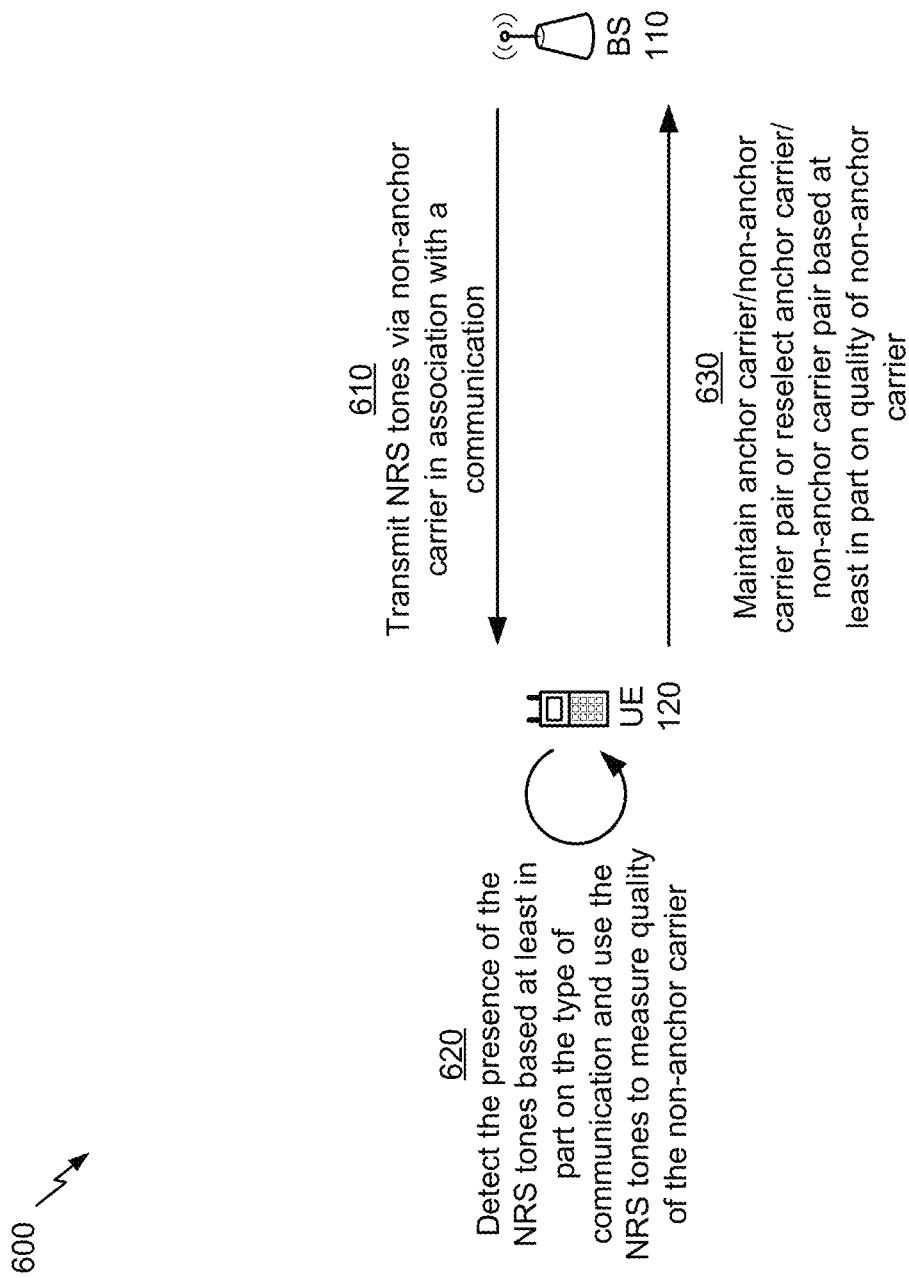

FIG. 6 is a diagram illustrating an example 600 of using NRS tones in a non-anchor carrier to determine a measure of quality of the non-anchor carrier, in accordance with various aspects of the present disclosure. As shown in FIG. 6, example 600 includes a BS 110 and a UE 120. UE 120, in example 600, may be configured to monitor paging in a non-anchor carrier of BS 110. In example 600 of FIG. 6, UE 120 uses NRS tones associated with one or more communications from BS 110 to assess the quality of the non-anchor carrier.

As shown in FIG. 6, and by reference number 610, BS 110 transmits NRS tones via a non-anchor carrier in association with a communication. Over the course of a communication session between BS 110 and UE 120, some communications may transmit or include NRS tones within the non-anchor carrier of the communication session. For example, a communication associated with a RACH procedure, a single cell point to multipoint (SC-PTM) transmission, and/or the like may send or include NRS tones, as such communications involve or are associated with BS 110 sending NRS tones. Accordingly, BS 110 may send one or more communications to UE 120 that are configured to include or be associated with NRS tones.

As further shown in FIG. 6, and by reference number 620, UE 120 is to detect the presence of NRS tones based at least in part on the type of communication and use the NRS tones to measure quality of the non-anchor carrier. For example, UE 120 may be configured to determine that an NRS tone is to be received via the non-anchor carrier based at least in part on a characteristic of the non-anchor carrier that indicates that an NRS tone is to be present during the communication. For example, UE 120 may determine which subframes of the non-anchor carrier are to include the NRS tone based at least in part on narrowband physical random access channel (NPRACH) resources (e.g., a location, a periodicity, a length, and/or the like of the NPRACH) or an NPDCCH search space periodicity (e.g., an offset, a length, and/or the like of the NPDCCH). In some aspects, UE 120 may activate from a low-power mode (or "wake up") to determine the SNR of the non-anchor carrier based at least in part on the NRS tone.

As further shown in FIG. 6, and by reference number 630, UE 120 may maintain the anchor carrier/non-anchor carrier pair or reselect the anchor carrier based at least in part on the measure of quality of the non-anchor carrier. UE 120 may use any suitable means to determine the quality of the non-anchor carrier using the NRS tone to maintain or reselect the anchor carrier/non-anchor carrier pair, as described herein.

Accordingly, UE 120 may take advantage of NRS tones that are provided during ordinary communications between BS 110 and UE 120. Therefore, by monitoring for NRS tones within the non-anchor carrier based at least in part on types of communications between BS 110 and UE 120, power resources and processing resources associated with monitoring for paging and/or reselecting an anchor carrier/non-anchor carrier pair can be conserved.

As indicated above, FIG. 6 is provided as an example. Other examples may differ from what is described with respect to FIG. 6.

Figure 7:
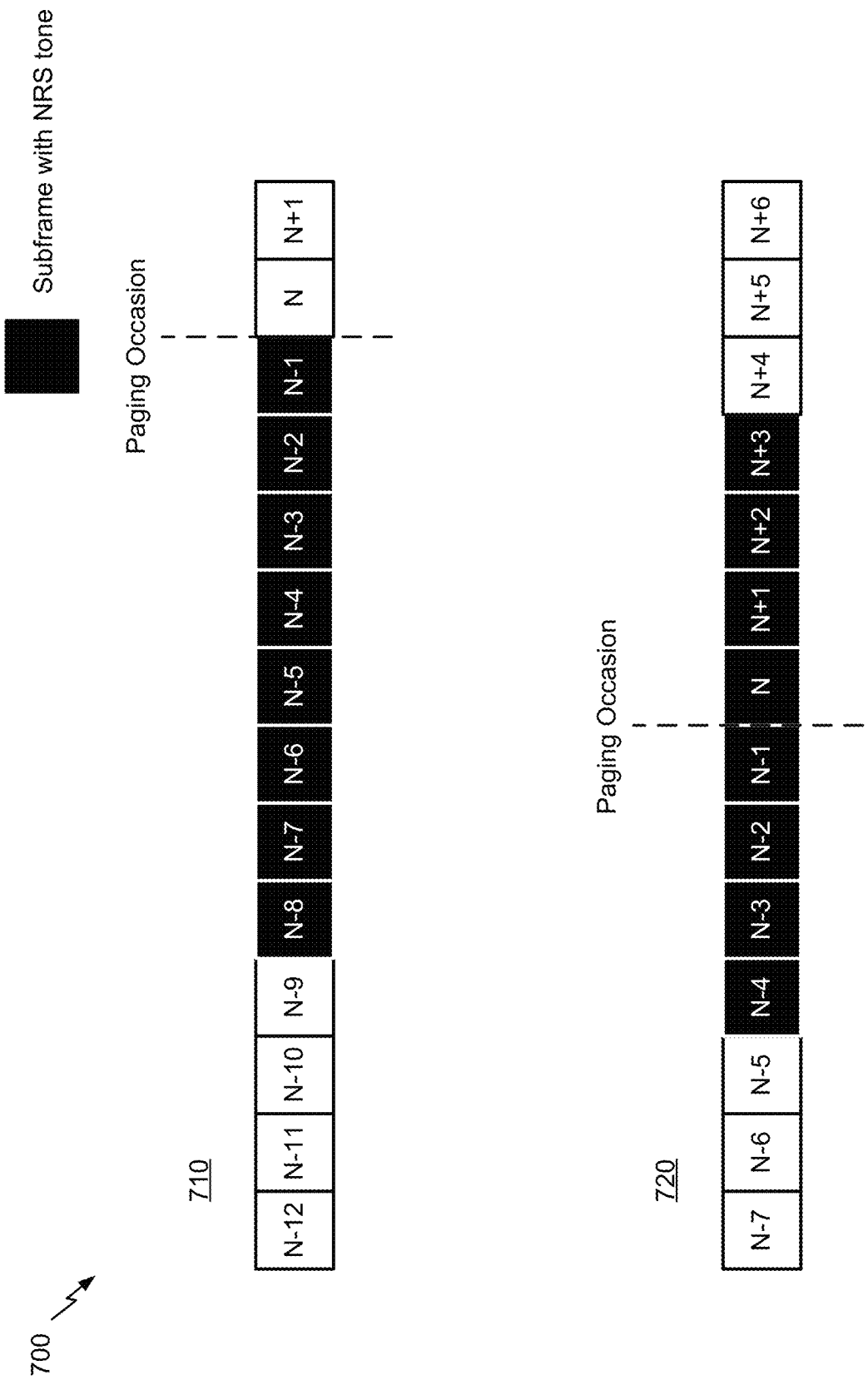

FIG. 7 is a diagram illustrating an example 700 of using NRS tones in a non-anchor carrier to determine a measure of quality of the non-anchor carrier, in accordance with various aspects of the present disclosure. As shown in FIG. 7, NRS tones may be provided within subframes of a non-anchor carrier in association with a scheduled paging occasion that is to occur at subframe N. In some aspects, each one of the subframes that is to include NRS tones includes a single, respective NRS tone. Example 700 illustrates how a configuration may identify a location of the NRS tones relative to a scheduled paging occasion.

As shown in FIG. 7, and by reference number 710, eight subframes (N−1 to N−8) (SF=8) are included within a set of subframes of the non-anchor carrier before the scheduled paging occasion. Accordingly, UE 120 may identify, based at least in part on the configuration, that eight subframes preceding the scheduled paging occasion (i.e., subframes N−1 to N−8) are to be monitored for NRS tones.

As shown in FIG. 7, and by reference number 720, eight subframes (N+3 to N−4) (SF=8) are included within a set of subframes of the non-anchor carrier during the scheduled paging occasion. Accordingly, a first set of subframes (N−1 to N−4) are to be received before the scheduled paging occasion and a second set of subframes (N to N+3) are to be received after the scheduled paging occasion. The first set of subframes may include the same number of subframes as the second set of subframes (as shown), or the first set of subframes may include a different number of subframes than the second set of subframes. Accordingly, UE 120 may identify, based at least in part on the configuration, that four subframes preceding the scheduled paging occasion (i.e., subframes N−1 to N−4) and four subframes succeeding the scheduled paging occasion (i.e., subframes N to N+3) are to be monitored for NRS tones.

Accordingly, a set of subframes (which may be defined by the SF indicated in the configuration of the system information) may include NRS tones that are to be received and/or detected by UE 120. As explained above, one or more subframes, of the set of subframes, may occur before and/or after the scheduled paging occasion.

As indicated above, FIG. 7 is provided as an example. Other examples may differ from what is described with respect to FIG. 7.

Figure 8A:
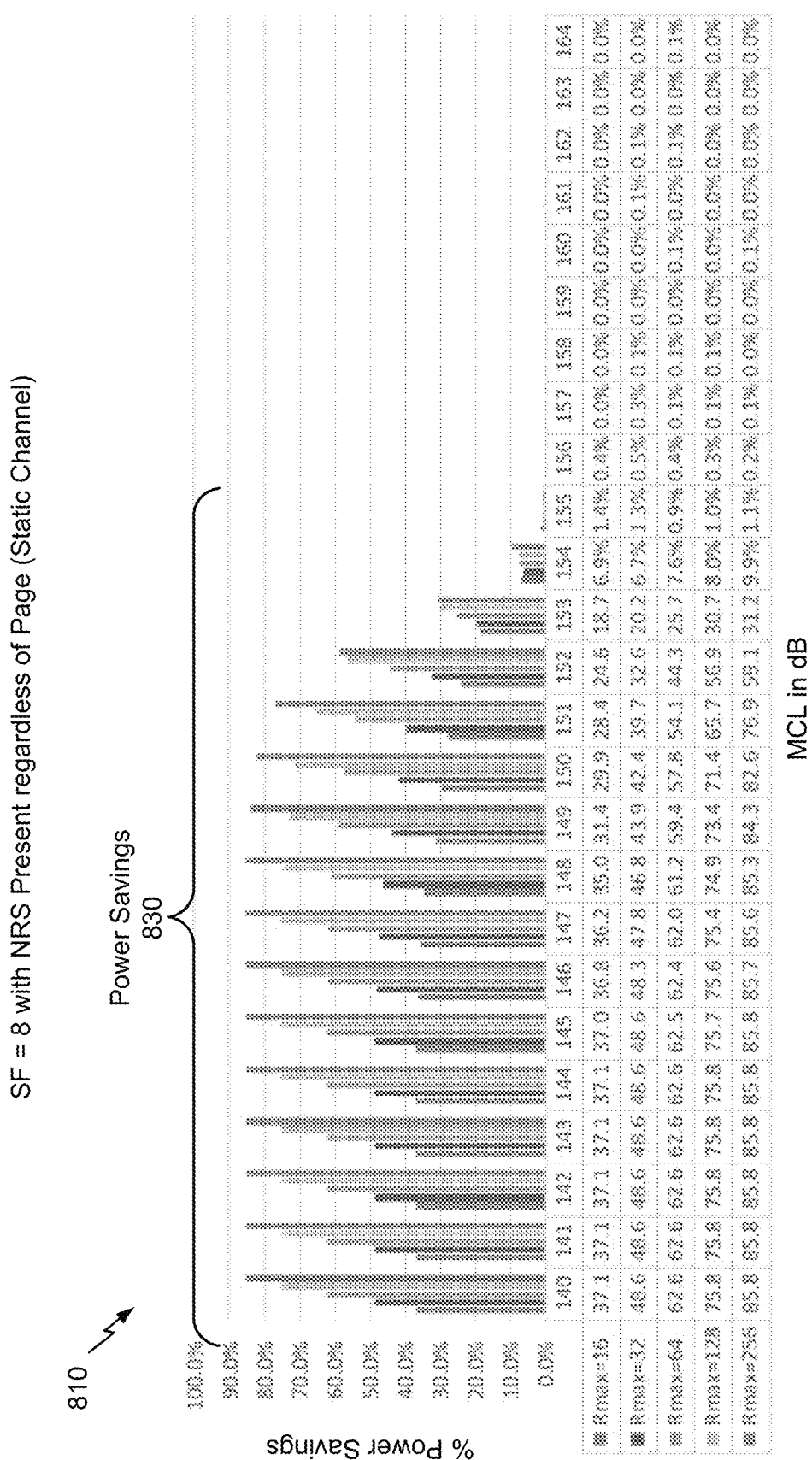
Figure 8B:
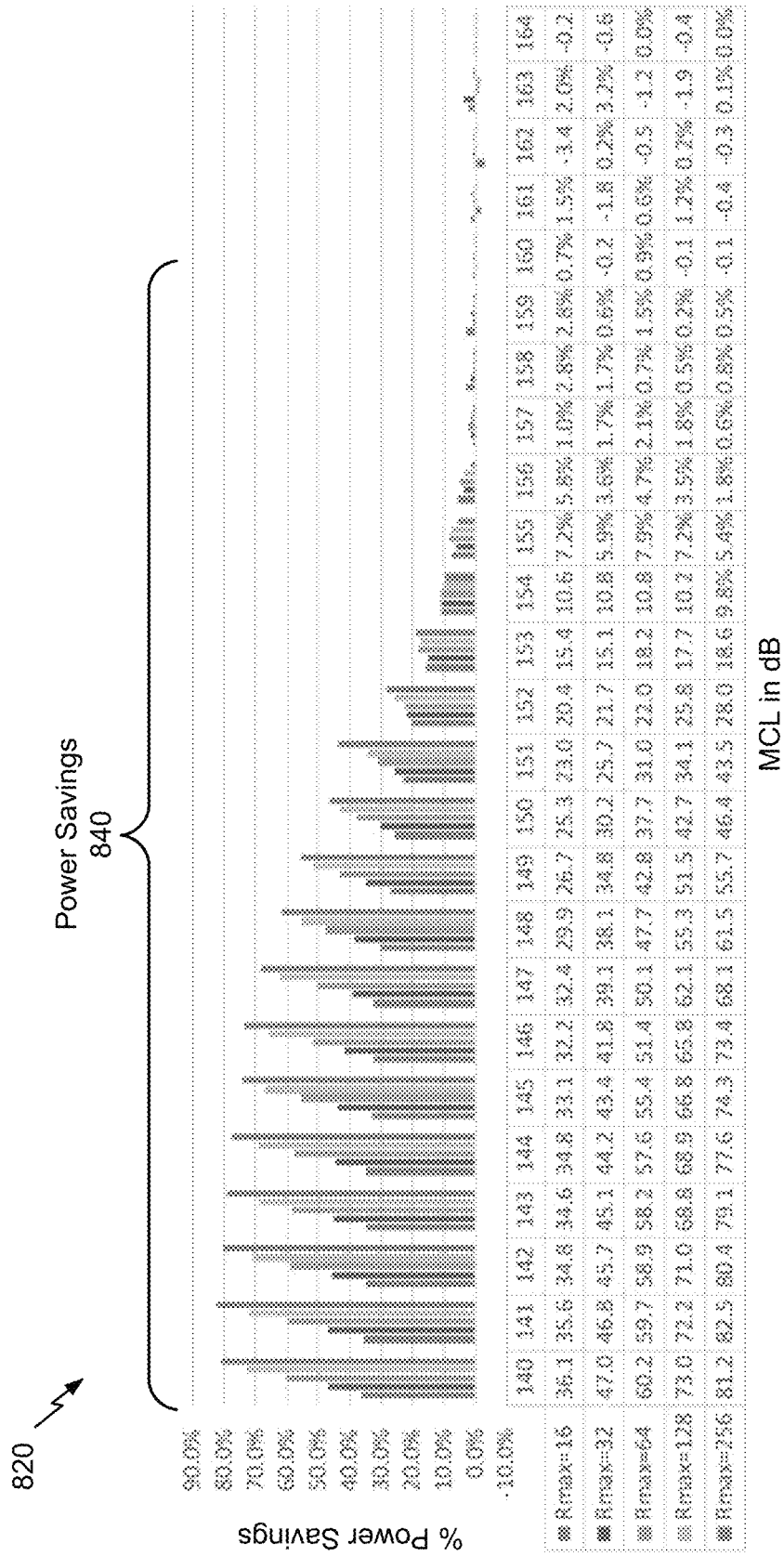

FIGS. 8A and 8B are diagrams illustrating examples associated with using NRS tones in a non-anchor carrier to determine a measure of quality of the non-anchor carrier, in accordance with various aspects of the present disclosure. FIGS. 8A and 8B include graphs 810, 820, respectively, that illustrate example power savings using NRS tones to determine a measure of quality of a non-anchor carrier in accordance with various aspects of the present disclosure. Graph 810 shows an example of power savings of using NRS tones provided and/or received in association with a paging occasion, regardless of the presence of a page on the non-anchor carrier, for a static channel, and Graph 820 shows an example of the same for a fading channel. As shown by reference number 830 in FIG. 8A, with a maximum coupling loss (MCL) of between 140 and at least 155 dB, power savings are achieved in a static channel for retransmissions (Rmax) of up to 16, 32, 64, 128, and 256. Further, as shown by reference number 840 in FIG. 8B, with an MCL between 140 and at least 160 dB, power savings are achieved in a fading channel for retransmissions (Rmax) of up to 16, 32, 64, 128, and 256.

As indicated above, FIGS. 8A and 8B are provided as examples. Other examples may differ from what is described with respect to FIGS. 8A and 8B.

FIG. 9 is a diagram illustrating an example process 900 performed, for example, by a UE, in accordance with various aspects of the present disclosure. Example process 900 is an example where a UE (e.g., UE 120) uses NRS tones received in association with a paging occasion, regardless of whether a page is received, to assess a quality of a non-anchor carrier.

As shown in FIG. 9, in some aspects, process 900 may include receiving a configuration for identifying NRS tones that are to be received in association with a scheduled paging occasion, wherein the NRS tones are configured to be received via a non-anchor carrier regardless of whether a page is to be received in connection with the scheduled paging occasion (block 910). For example, UE 120 (e.g., using antenna 252, demodulator 254, MIMO detector 256, receive processor 258, controller/processor 280, and/or the like) may receive the configuration from BS 110 to determine a measure of quality of the non-anchor carrier. In some aspects, UE 120 may receive the configuration based at least in part on being in communication with BS 110, based at least in part on being within a communication range of BS 110, and/or the like.

As shown in FIG. 9, in some aspects, process 900 may include receiving the NRS tones via the non-anchor carrier based at least in part on the configuration (block 920). For example, UE 120 (e.g., using receive processor 258, controller/processor 280, and/or the like) may receive the NRS tones via the non-anchor carrier based at least in part on the configuration, as described above.

Process 900 may include additional aspects, such as any single aspect or any combination of aspects described below and/or in connection with one or more other processes described elsewhere herein.

In a first aspect, process 900 includes determining, during the scheduled paging occasion, a quality measurement of the non-anchor carrier based at least in part on one or more of the NRS tones.

In a second aspect, alone or in combination with the first aspect, the quality measurement comprises a radio resource management (RRM) measurement.

In a third aspect, alone or in combination with one or more of the first and second aspects, the UE is configured to determine a signal-to-noise ratio (SNR), of the non-anchor carrier, from at least one of the NRS tones.

In a fourth aspect, alone or in combination with one or more of the first through third aspects, the UE is configured to reselect a carrier based at least in part on a quality measurement, wherein the quality measurement indicates that a quality of the non-anchor carrier is not suitable to receive a page within a threshold number of attempts to receive the page.

In a fifth aspect, alone or in combination with one or more of the first through fourth aspects, the UE is configured to maintain at least one of a time tracking loop or a frequency tracking loop based at least in part on a quality measurement, wherein the quality measurement indicates that a quality of the non-anchor carrier is suitable to receive a page within a threshold number of attempts to receive the page.

In a sixth aspect, alone or in combination with one or more of the first through fifth aspects, the configuration identifies a minimum spreading factor of the NRS tones relative to a timing of the scheduled paging occasion.

In a seventh aspect, alone or in combination with one or more of the first through sixth aspects, the configuration identifies a minimum number of subframes with presence of NRS tones relative to a timing of the scheduled paging occasion.

In an eighth aspect, alone or in combination with one or more of the first through seventh aspects, the configuration identifies that zero NRS tones are to be received when the UE is not to use NRS tones in the non-anchor carrier to determine a quality measurement.

In a ninth aspect, alone or in combination with one or more of the first through eighth aspects, the configuration is received within system information (SI) provided to the UE by a network.

In a tenth aspect, alone or in combination with one or more of the first through ninth aspects, the configuration identifies locations of the NRS tones relative to the scheduled paging occasion.

In an eleventh aspect, alone or in combination with one or more of the first through tenth aspects, the configuration identifies that the NRS tones are to be located within a set of subframes of the non-anchor carrier to be received before the scheduled paging occasion.

In a twelfth aspect, alone or in combination with one or more of the first through eleventh aspects, the configuration identifies that a first set of the NRS tones are to be located within a first set of subframes to be received before the scheduled paging occasion and a second set of the NRS tones are to be located within a second set of subframes to be received after the scheduled paging occasion.

In a thirteenth aspect, alone or in combination with the twelfth aspect, a number of subframes in the first set of subframes matches a number of subframes in the second set of subframes.

In a fourteenth aspect, alone or in combination with one or more of the first through thirteenth aspects, the configuration identifies at least one of: that the NRS tones are to be received in a subset of discontinuous reception cycles associated with the non-anchor carrier; at least one of a periodicity, a timing, an offset, or a number of subframes associated with the NRS tones regardless of a discontinuous reception cycle associated with the non-anchor carrier, or a combination thereof.

In a fifteenth aspect, alone or in combination with one or more of the first through fourteenth aspects, a number of the NRS tones to be received is preconfigured based at least in part on a specification of a network of the non-anchor carrier.

In a sixteenth aspect, alone or in combination with one or more of the first through fifteenth aspects, the UE is configured to avoid tuning to an anchor carrier for resynchronization when a signal-to-noise ratio (SNR) determined in association with a quality measurement satisfies a threshold SNR, wherein the anchor carrier is associated with the non-anchor carrier.

In a seventeenth aspect, alone or in combination with one or more of the first through sixteenth aspects, the configuration identifies that the NRS tones are to be received once every threshold number of discontinuous reception cycles associated with the non-anchor carrier.

In an eighteenth aspect, alone or in combination with one or more of the first through seventeenth aspects, the configuration identifies at least one of a periodicity, a timing, an offset, or a number of subframes associated with the NRS tones regardless of a discontinuous reception cycle associated with the non-anchor carrier.

In a nineteenth aspect, alone or in combination with one or more of the first through eighteenth aspects, the UE is configured to identify the NRS tones once every threshold number of discontinuous reception cycles associated with the non-anchor carrier.

In a twentieth aspect, alone or in combination with one or more of the first through nineteenth aspects, the UE is configured to determine, during a first discontinuous reception cycle, a quality measurement based at least in part on an NRS tone received via an anchor carrier associated with the non-anchor carrier and determine, during a second discontinuous reception cycle, a signal-to-noise ratio based at least in part on one of the NRS tones received via the non-anchor carrier.

In a twenty-first aspect, alone or in combination with one or more of the first through twentieth aspects, the UE is configured to identify the NRS tones during a first discontinuous reception cycle and perform a wake up signal detection or a narrowband physical downlink control channel (NPDCCH) detection during a second discontinuous reception cycle that is different from the first discontinuous reception cycle. In some aspects, each of the NRS tones is received within a respective subframe of the non-anchor carrier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with various aspects of the present disclosure. Example process 1000 is an example where a UE (e.g., UE 120) performs detection of NRS tones within communications from a BS (e.g., BS 110) over a non-anchor carrier and uses the NRS tones to determine a measure of quality of the non-anchor carrier.

As shown in FIG. 10, in some aspects, process 1000 may include determining that an NRS tone is to be received via a non-anchor carrier based at least in part on a characteristic of the non-anchor carrier (block 1010). For example, UE 120 (e.g., using receive processor 258, controller/processor 280, and/or the like) may determine that the NRS tone is to be received from BS 110. In some aspects, UE 120 may determine that the NRS tone is to be received from BS 110 based at least in part on receiving system information from BS 110, based at least in part on being in communication with BS 110, based at least in part on being in communication range of BS 110, and/or the like.

As shown in FIG. 10, in some aspects, process 1000 may include activating from a low-power mode to determine an SNR of the non-anchor carrier based at least in part on the NRS tone (block 1020). For example, UE 120 (e.g., using receive processor 258, controller/processor 280, and/or the like) may activate from low-power mode to determine the SNR of the non-anchor carrier. In some aspects, UE 120 may activate from the low-power mode based at least in part on determining that the NRS tone is to be received via the non-anchor carrier.

Process 1000 may include additional aspects, such as any single aspect or any combination of aspects described below and/or in connection with one or more other processes described elsewhere herein.

In a first aspect, the UE is configured to monitor paging in the non-anchor carrier.

In a second aspect, alone or in combination with the first aspect, the characteristic comprises the non-anchor carrier being configured for a random access channel procedure.

In a third aspect, alone or in combination with one or more of the first and second aspects, the UE is configured to determine which subframes of the non-anchor carrier are to include the NRS tone based at least in part on at least one of narrowband physical random access channel (NPRACH) resources or narrowband physical downlink control channel (NPDCCH) search space periodicity.

In a fourth aspect, alone or in combination with one or more of the first through third aspects, the UE is configured to activate from the low-power mode for a paging occasion in addition to activating from the low-power mode to determine the SNR based at least in part on the NRS tone.

In a fifth aspect, alone or in combination with one or more of the first through fourth aspects, the characteristic comprises the non-anchor carrier including a single cell point to multipoint (SC-PTM) transmission.

In a sixth aspect, alone or in combination with one or more of the first through fifth aspects, the characteristic comprises at least one of: the non-anchor carrier being configured for a random access channel procedure, the non-anchor carrier including a single cell point to multipoint (SC-PTM) transmission, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a BS, in accordance with various aspects of the present disclosure. Example process 1100 is an example where a BS (e.g., BS 110) determines a configuration for providing NRS tones, via a non-anchor carrier, in association with scheduled paging occasions to permit a UE (e.g., UE 120) to determine a measure of quality of the non-anchor carrier.

As shown in FIG. 11, in some aspects, process 1100 may include determining a configuration for providing NRS tones in association with a scheduled paging occasion (block 1110). For example, BS 110 (e.g., using controller/processor 240, scheduler 246, and/or the like) may determine the configuration for providing the NRS tones to UE 120. In some aspects, BS 110 may determine the configuration based at least in part on being in communication with UE 120, based at least in part on UE 120 being within communication range of BS 110, and/or the like.

As shown in FIG. 11, in some aspects, process 1100 may include providing the NRS tones to at least one user equipment, via a non-anchor carrier, regardless of whether a page is to be provided in connection with the scheduled paging occasion, wherein at least one of the NRS tones permits a quality measurement, of the non-anchor carrier, to be made by the at least one user equipment (block 1120). For example, BS 110 (e.g., using transmit processor 220, TX MIMO processor 230, modulator 232, antenna 234, controller/processor 240, and/or the like) may provide the NRS tones to at least one UE 120. In some aspects, BS 110 may provide the NRS tones based at least in part on determining the configuration for providing the NRS tones.

Process 1100 may include additional aspects, such as any single aspect or any combination of aspects described below and/or in connection with one or more other processes described elsewhere herein.

In a first aspect, the quality measurement comprises a radio resource management (RRM) measurement.

In a second aspect, alone or in combination with the first aspect, at least one of the NRS tones permits an SNR, of the non-anchor carrier, to be determined by the at least one user equipment.

In a third aspect, alone or in combination with one or more of the first and second aspects, the configuration identifies a minimum spreading factor of the NRS tones relative to a timing of the scheduled paging occasion.

In a fourth aspect, alone or in combination with one or more of the first through third aspects, the configuration identifies a minimum number of subframes with presence of NRS tones relative to a timing of the scheduled paging occasion.

In a fifth aspect, alone or in combination with one or more of the first through fourth aspects, the configuration identifies that zero NRS tones are to be received when NRS tones, in the non-anchor carrier, are not to be used to determine a quality measurement.

In a sixth aspect, alone or in combination with one or more of the first through fifth aspects, the configuration is provided within system information (SI) provided to the at least one user equipment.

In a seventh aspect, alone or in combination with one or more of the first through sixth aspects, the configuration identifies locations of the NRS tones relative to the scheduled paging occasion.

In an eighth aspect, alone or in combination with one or more of the first through seventh aspects, the configuration identifies that the NRS tones are to be located within a set of subframes of the non-anchor carrier provided before the scheduled paging occasion.

In a ninth aspect, alone or in combination with one or more of the first through eighth aspects, the configuration identifies that a first set of the NRS tones are to be located within a first set of subframes provided before the scheduled paging occasion, and a second set of the NRS tones are to be located within a second set of subframes provided after the scheduled paging occasion.

In a tenth aspect, alone or in combination with the ninth aspect, a number of subframes in the first set of subframes matches a number of subframes in the second set of subframes.

In an eleventh aspect, alone or in combination with one or more of the first through tenth aspects, the configuration identifies at least one of: that the NRS tones are to be located within a set of subframes of the non-anchor carrier provided before the scheduled paging occasion, that a first set of the NRS tones are to be located within a first set of subframes provided before the scheduled paging occasion and a second set of the NRS tones are to be located within a second set of subframes provided after the scheduled paging occasion, or a combination thereof.

In a twelfth aspect, alone or in combination with one or more of the first through eleventh aspects, a number of the NRS tones provided to the at least one user equipment is preconfigured based at least in part on a specification of a network of the non-anchor carrier.

In a thirteenth aspect, alone or in combination with one or more of the first through twelfth aspects, the NRS tones are to be provided, via the non-anchor carrier, once every threshold number of discontinuous reception cycles associated with the non-anchor carrier.

In a fourteenth aspect, alone or in combination with one or more of the first through thirteenth aspects, the NRS tones are to be provided, via the non-anchor carrier, in a subset of discontinuous reception cycles associated with the non-anchor carrier.

In a fifteenth aspect, alone or in combination with one or more of the first through fourteenth aspects, the configuration identifies at least one of a periodicity, a timing, an offset, or a number of subframes associated with the NRS tones regardless of a discontinuous reception cycle associated with the non-anchor carrier.

In a sixteenth aspect, alone or in combination with one or more of the first through fifteenth aspects, each of the NRS tones is provided within a respective subframe of the non-anchor carrier.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
    receiving a configuration for identifying narrowband reference signal (NRS) tones that are to be received in association with a scheduled paging occasion,
        wherein the NRS tones are configured to be received via a non-anchor carrier regardless of whether a page is to be received in connection with the scheduled paging occasion, and
        wherein the configuration identifies:
            that the NRS tones are to be received in a subset of discontinuous reception cycles associated with the non-anchor carrier,
            at least one of a periodicity, a timing, an offset, or a number of subframes associated with the NRS tones regardless of a discontinuous reception cycle associated with the non-anchor carrier, or
            a combination thereof; and
    receiving the NRS tones via the non-anchor carrier based at least in part on the configuration.

2. The method of claim 1, further comprising determining, during the scheduled paging occasion, a quality measurement of the non-anchor carrier based at least in part on one or more of the NRS tones.

3. The method of claim 2, wherein the quality measurement comprises a radio resource management (RRM) measurement.

4. The method of claim 1, wherein the UE is configured to determine a signal-to-noise ratio (SNR), of the non-anchor carrier, from at least one of the NRS tones.

5. The method of claim 1, wherein the configuration identifies a minimum number of subframes with presence of NRS tones relative to a timing of the scheduled paging occasion.

6. The method of claim 1, wherein the configuration is received within system information (SI) provided to the UE by a network.

7. The method of claim 1, wherein the configuration identifies locations of the NRS tones relative to the scheduled paging occasion.

8. The method of claim 1, wherein the configuration identifies that the NRS tones are to be located within a set of subframes of the non-anchor carrier to be received before the scheduled paging occasion.

9. The method of claim 1, wherein the configuration identifies that a first set of the NRS tones are to be located within a first set of subframes to be received before the scheduled paging occasion and a second set of the NRS tones are to be located within a second set of subframes to be received after the scheduled paging occasion.

10. The method of claim 1, wherein a number of the NRS tones to be received is preconfigured based at least in part on a specification of a network of the non-anchor carrier.

11. The method of claim 1, wherein the UE is configured to avoid tuning to an anchor carrier for resynchronization when a signal-to-noise ratio (SNR) determined in association with a quality measurement satisfies a threshold SNR, wherein the anchor carrier is associated with the non-anchor carrier.

12. The method of claim 1, wherein each of the NRS tones is received within a respective subframe of the non-anchor carrier.

13. A method of wireless communication performed by a user equipment (UE), comprising:
    determining that a narrowband reference signal (NRS) tone is to be received via a non-anchor carrier based at least in part on a characteristic of the non-anchor carrier; and
    activating from a low-power mode to determine a signal-to-noise ratio (SNR) of the non-anchor carrier based at least in part on the NRS tone.

14. The method of claim 13, wherein the UE is configured to monitor paging in the non-anchor carrier.

15. The method of claim 13, wherein the characteristic comprises at least one of:
    the non-anchor carrier being configured for a random access channel procedure,
    the non-anchor carrier including a single cell point to multipoint (SC-PTM) transmission, or
    a combination thereof.

16. The method of claim 13, wherein the UE is configured to determine which subframes of the non-anchor carrier are to include the NRS tone based at least in part on at least one of narrowband physical random access channel (NPRACH) resources or narrowband physical downlink control channel (NPDCCH) search space periodicity.

17. The method of claim 13, wherein the UE is configured to activate from the low-power mode for a paging occasion in addition to activating from the low-power mode to determine the SNR based at least in part on the NRS tone.

18. A method of wireless communication performed by a base station (BS), comprising:
    determining a configuration for providing narrowband reference signal (NRS) tones in association with a scheduled paging occasion,
        wherein the configuration identifies:
            that the NRS tones are to be provided, via a non-anchor carrier, in a subset of discontinuous reception cycles associated with the non-anchor carrier,
            at least one of a periodicity, a timing, an offset, or a number of subframes associated with the NRS tones regardless of a discontinuous reception cycle associated with the non-anchor carrier, or
            a combination thereof; and
    providing the NRS tones to at least one user equipment, via the non-anchor carrier, regardless of whether a page is to be provided in connection with the scheduled paging occasion,
        wherein at least one of the NRS tones permits a quality measurement, of the non-anchor carrier, to be made by the at least one user equipment.

19. The method of claim 18, wherein the quality measurement comprises a radio resources management (RRM) measurement.

20. The method of claim 18, wherein at least one of the NRS tones permits a signal-to-noise ratio (SNR), of the non-anchor carrier, to be determined by the at least one user equipment.

21. The method of claim 18, wherein the configuration identifies a minimum number of subframes with presence of NRS tones relative to a timing of the scheduled paging occasion.

22. The method of claim 18, wherein the configuration is provided within system information (SI) provided to the at least one user equipment.

23. The method of claim 18, wherein the configuration identifies locations of the NRS tones relative to the scheduled paging occasion.

24. The method of claim 18, wherein the configuration identifies at least one of:
    that the NRS tones are to be located within a set of subframes of the non-anchor carrier provided before the scheduled paging occasion,
    that a first set of the NRS tones are to be located within a first set of subframes provided before the scheduled paging occasion and a second set of the NRS tones are to be located within a second set of subframes provided after the scheduled paging occasion, or
    a combination thereof.

25. The method of claim 18, wherein a number of the NRS tones provided to the at least one user equipment is preconfigured based at least in part on a specification of a network of the non-anchor carrier.

26. The method of claim 18, wherein each of the NRS tones is provided within a respective subframe of the non-anchor carrier.

27. A user equipment (UE) for wireless communication, comprising:
    memory; and
    one or more processors operatively coupled to the memory, the memory and the one or more processors configured to:
        receive a configuration for identifying narrowband reference signal (NRS) tones that are to be received in association with a scheduled paging occasion,
            wherein the NRS tones are configured to be received via a non-anchor carrier regardless of whether a page is to be received in connection with the scheduled paging occasion, and
            wherein the configuration identifies:
                that the NRS tones are to be received in a subset of discontinuous reception cycles associated with the non-anchor carrier,
                at least one of a periodicity, a timing, an offset, or a number of subframes associated with the NRS tones regardless of a discontinuous reception cycle associated with the non-anchor carrier, or
                a combination thereof; and
        receive the NRS tones via the non-anchor carrier based at least in part on the configuration.

28. The UE of claim 27, wherein the one or more processors are further configured to:
    determine, during the scheduled paging occasion, a quality measurement of the non-anchor carrier based at least in part on one or more of the NRS tones.

29. The UE of claim 27, wherein the configuration further identifies at least one of:
    a minimum number of subframes with presence of NRS tones relative to a timing of the scheduled paging occasion,
    locations of the NRS tones relative to the scheduled paging occasion,
    that the NRS tones are to be located within a set of subframes of the non-anchor carrier to be received before the scheduled paging occasion, or
    that a first set of the NRS tones are to be located within a first set of subframes to be received before the scheduled paging occasion and a second set of the NRS tones are to be located within a second set of subframes to be received after the scheduled paging occasion.

30. The UE of claim 27, wherein the one or more processors are further configured to:

determine a signal-to-noise ratio (SNR), of the non-anchor carrier, from at least one of the NRS tones.

\* \* \* \* \*